United States Patent
Yano

(10) Patent No.: US 9,424,496 B2
(45) Date of Patent: Aug. 23, 2016

(54) IMAGE FORMING APPARATUS WITH IMAGE DEFORMATION CORRECTION USING USER INPUT LENGTH INFORMATION OF TEST IMAGE LINE DRAWING

(71) Applicant: CANON KABUSHIKI KAISHA, Tokyo (JP)

(72) Inventor: Yuzuru Yano, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/676,043

(22) Filed: Apr. 1, 2015

(65) Prior Publication Data
US 2015/0286901 A1    Oct. 8, 2015

(30) Foreign Application Priority Data
Apr. 4, 2014 (JP) ................. 2014-077525

(51) Int. Cl.
| | |
|---|---|
| G06K 15/14 | (2006.01) |
| H04N 1/00 | (2006.01) |
| H04N 1/29 | (2006.01) |
| B41J 2/435 | (2006.01) |
| G03G 15/043 | (2006.01) |
| G06K 15/02 | (2006.01) |
| H04N 1/23 | (2006.01) |
| G06K 15/12 | (2006.01) |
| G03G 15/00 | (2006.01) |
| B41J 29/393 | (2006.01) |

(52) U.S. Cl.
CPC .............. *G06K 15/027* (2013.01); *B41J 2/435* (2013.01); *G03G 15/043* (2013.01); *G03G 15/5062* (2013.01); *G06K 15/1204* (2013.01); *G06K 15/14* (2013.01); *H04N 1/00015* (2013.01); *H04N 1/00031* (2013.01); *H04N 1/00034* (2013.01); *H04N 1/00045* (2013.01); *H04N 1/00082* (2013.01); *H04N 1/00352* (2013.01); *H04N 1/2346* (2013.01); *H04N 1/29* (2013.01); *B41J 2029/3935* (2013.01); *G03G 2215/00569* (2013.01)

(58) Field of Classification Search
None
See application file for complete search history.

(56) References Cited

U.S. PATENT DOCUMENTS

| | | | | |
|---|---|---|---|---|
| 5,831,658 A | * | 11/1998 | Iga .......................... | G06K 15/02 347/171 |
| 6,106,095 A | * | 8/2000 | Jackson .................. | B41J 2/2135 347/19 |
| 7,548,326 B2 | * | 6/2009 | Fukushima ........ | H04N 1/00015 358/504 |
| 8,717,639 B2 | * | 5/2014 | Arakawa .................. | H04N 1/04 358/504 |
| 8,867,097 B2 | * | 10/2014 | Mizuno .................. | G06K 15/02 358/504 |
| 2007/0139715 A1 | | 6/2007 | Kazama et al. | |
| 2013/0155428 A1 | * | 6/2013 | Mizuno .................. | G06K 15/02 358/1.9 |
| 2015/0286909 A1 | * | 10/2015 | Yano .................. | G06K 15/1886 358/1.17 |
| 2015/0338809 A1 | * | 11/2015 | Omura ............... | G03G 15/0131 399/301 |

* cited by examiner

*Primary Examiner* — Scott A Rogers
(74) *Attorney, Agent, or Firm* — Fitzpatrick, Cella, Harper & Scinto

(57) ABSTRACT

An image forming apparatus for easily setting a parameter for avoiding an occurrence of defective image by the sector deformation is provided. The image forming apparatus forms a test image. The test image having a first line drawing and a second line drawing, each of which is extending in a first direction, and the first line drawing and the second line drawing are provided at different positions in a second direction which is perpendicular to the first direction. Further, the image forming apparatus obtains the length information of the first and the second line drawings. Based on the length information of the first and the second line drawings, a correction condition is set. Then, the image forming apparatus corrects the image data based on the correction condition according to a position of the second direction.

9 Claims, 15 Drawing Sheets

FIG. 7A

| MAIN SCANNING POSITION [pix] | -162.5 | -160 | -120 | -80 | -40 | 0 | 40 | 80 | 120 | 160 | 162.5 |
|---|---|---|---|---|---|---|---|---|---|---|---|
| VARIATION AMOUNT [mm] | 0.677 | 0.667 | 0.500 | 0.333 | 0.167 | 0.000 | -0.167 | -0.333 | -0.500 | -0.667 | -0.677 |

FIG. 7B

| MAIN SCANNING POSITION [pix] | -162.5 | -160 | -120 | -80 | -40 | 0 | 40 | 80 | 120 | 160 | 162.5 |
|---|---|---|---|---|---|---|---|---|---|---|---|
| VARIATION AMOUNT [mm] | 0.711 | 0.700 | 0.525 | 0.350 | 0.175 | 0.000 | -0.175 | -0.350 | -0.525 | -0.700 | -0.711 |

FIG. 7C

| MAIN SCANNING POSITION [pix] | -15354 | -15118 | -11339 | -7559 | -3780 | 0 | 3780 | 7559 | 11339 | 15118 | 15354 |
|---|---|---|---|---|---|---|---|---|---|---|---|
| VARIATION AMOUNT [pix] | 64 | 63 | 47 | 31 | 16 | 0 | -16 | -31 | -47 | -63 | -64 |

FIG. 7D

| MAIN SCANNING POSITION [pix] | -15354 | -15118 | -11339 | -7559 | -3780 | 0 | 3780 | 7559 | 11339 | 15118 | 15354 |
|---|---|---|---|---|---|---|---|---|---|---|---|
| VARIATION AMOUNT [pix] | -64 | -63 | -47 | -31 | -16 | 0 | 16 | 31 | 47 | 63 | 64 |

FIG. 7E

| MAIN SCANNING POSITION [pix] | 0 | 236 | 4015 | 7795 | 11574 | 15354 | 19134 | 22913 | 26693 | 30472 | 30708 |
|---|---|---|---|---|---|---|---|---|---|---|---|
| VARIATION AMOUNT [pix] | -64 | -63 | -47 | -31 | -16 | 0 | 16 | 31 | 47 | 63 | 64 |

| MAIN SCANNING POSITION [pix] | 0 | 4 | 8 | 12 | 16 |
|---|---|---|---|---|---|
| CORRECTION VALUE [pix] | −2 | −1 | 0 | 1 | 2 |

|  | AREA 0 | AREA 1 | AREA 2 | AREA 3 | AREA 4 |
|---|---|---|---|---|---|
| MAIN SCANNING POSITION [pix] | 0 | 4 | 8 | 12 | 16 |
| CORRECTION VALUE [pix] | −2 | −1 | 0 | 1 | 2 |

IMAGE FORMING APPARATUS WITH IMAGE DEFORMATION CORRECTION USING USER INPUT LENGTH INFORMATION OF TEST IMAGE LINE DRAWING

BACKGROUND OF THE INVENTION

1. Field of the Invention

The present disclosure relates to an image forming apparatus which forms an image by an electrostatic latent image.

2. Description of the Related Art

In an image forming apparatus such as color laser beam printers, digital copiers, and the like, the image is temporarily formed on an intermediate transfer member. The image formed on the intermediate transfer member is then transferred onto a recording medium (for example, sheet). Then, the image is printed. As the intermediate transfer member, for example, a belt which is formed into an endless shape is used. Transferring the image formed on the intermediate transfer member to the recording medium is called a secondary transfer.

FIG. 16 is a diagram for explaining a secondary transfer mechanism. A driven roller 110 and a secondary transfer roller 112 are arranged to face each other. When a driving roller 108 rotates at a constant speed, the intermediate transfer belt 107 moves at a constant speed. A sheet S is conveyed along with a guide 131 by a conveyance roller 130 and the secondary roller 112, which rotate at a constant speed. Thereafter, the secondary transfer is performed to the sheet S. In this case, the intermediate transfer belt 107 is designed to move at the same speed at which the sheet S is conveyed. Actually, however, this is not always the case. In the following, a particular example is explained using FIGS. 17A and 17B.

FIG. 17A is a diagram for explaining an arrangement of the driven roller 110 and the secondary transfer roller 112 in a case where the intermediate transfer belt 107 moves at the same speed at which the sheet S is conveyed. A longitudinal direction of the column-shaped driven roller 110 is defined as a main scanning direction. A direction which is vertical to the main scanning direction is defined as a sub-scanning direction. In the arrangement shown in FIG. 17A, a rotary shaft 110z of the driven roller 110 is in parallel with a rotary shaft 112z of the secondary transfer roller 112. Therefore, a pressure (nip pressure) of a portion at which the driving roller 110 and the secondary transfer roller 112 contact each other (nip portion) is constant regardless of a position in the main scanning direction (main scanning position). Thereby, the sheet S is conveyed at the same speed at which the intermediate transfer belt 107 moves.

FIG. 17B is a diagram for explaining an arrangement of the driven roller 110 and the secondary transfer roller 112 in a case where the intermediate transfer belt 107 does not move at the same speed at which the sheet S is conveyed. In the arrangement shown in FIG. 17B, a rotary shaft 110z of the driven roller 110 is not in parallel with a rotary shaft 112z of the secondary transfer roller 112. Due to this, the nip pressure of the driven roller 110 and the secondary transfer roller 112 differ according to the main scanning position. For example, a distance between the shafts of the driven roller 110 and the secondary transfer roller 112 at the main scanning position (x) in FIG. 17B is longer than that in the arrangement shown in FIG. 17A. Therefore, the nip pressure at the main scanning position (x), located at a left side in FIG. 17B, is relatively low. On the other hand, a distance between the shafts of the driven roller 110 and the secondary transfer roller 112 at the main scanning position (y) in the arrangement shown in FIG. 15B is shorter than that in the arrangement shown in FIG. 15A. Therefore, the nip pressure at the main scanning direction (y) is relatively high. As mentioned, if the nip pressure differs according to the main scanning position, the pressure applied to the sheet S by the driven roller 110 and the secondary transfer roller 112 also differs according to the main scanning direction. Further, the higher the nip pressure is, the faster the sheet S is conveyed. Also, the lower the nip pressure is, the slower the sheet S is conveyed. This is because as the nip pressure is high, the frictional force to the sheet S also enhances, which enables easy transmission of the rotational force to the sheet S. Due to this, the conveyance speed of the sheet S differs according to the main scanning position in the arrangement shown in FIG. 17B.

FIG. 17B shows a case where a print operation is performed in a state where the nip pressure is different for every main scanning position. In this case, as the sheet S passes through the nip portion, it performs a sector-like rotation. As a result, a deviation is caused in the secondary transfer. For example, when printing an image shown in FIG. 18A, as shown in FIG. 18B, the shape is printed in a distorted shape. The distortion is compared to a sector. A position at low nip pressure at the main scanning position is an outer peripheral side of the sector. Also, a position at high nip pressure at the main scanning position is an inner peripheral side of the sector. In the following, such distortion is called a sector deformation.

FIG. 18B shows a sheet having experienced the sector deformation, in which distortion amount b1 and distortion amount b2 at the main scanning positions respectively are about 0.1[mm]. Further, the distortion amount b3 at a position of a sub-scanning direction (sub-scanning position) is about 0.5 [mm]. As above, the distortion amount b3 at the sub-scanning position is several times larger than the distortion amounts b1 and b2 at the main scanning positions. Due to this, the distortion of the sub-scanning direction by the sector deformation significantly affects the print image quality, which is a problem.

To this problem, an image forming apparatus as disclosed in US Patent Application Publication No. US2007/0139715 (A1) intends to realize correction processing to the sector deformation by image data conversion processing. In particular, by detecting an output image formed on a printed sheet, a deformation parameter of the sector deformation is obtained. Based on the result as obtained, in the following printing operation, image data is converted in advance to cancel the occurrence of the distortion caused by the sector deformation. This is to avoid the occurrence of any defective image caused by the sector deformation.

On the other hand, in the image forming apparatus as disclosed in US Patent Application Publication No. US2007/0139715(A1), a sector deformation parameter is obtained by detecting an entire image of the output image formed on the printed sheet. Therefore, the image forming apparatus is required to have many sensors for detection, a configuration for highly recognizing the detected image, and large capacity memory. As a result, the time required to manufacture the image forming apparatus and parts for constituting the image forming apparatus largely increase. Thereby, a manufacturing cost of the image forming apparatus largely increases, which is a problem.

It is a main object of the present disclosure to provide an image forming apparatus which is capable of easily setting a parameter for avoiding an occurrence of defective image by the sector deformation.

SUMMARY OF THE INVENTION

An image forming apparatus of the present disclosure includes: a correction unit configured to correct image data based on a correction condition; an image forming unit configured to form an image on a conveyed recording medium based on the corrected image data; a control unit configured to cause the image forming unit to form a test image, the test image having a first line drawing and a second line drawing, each of which is extending in a first direction, and the first line drawing and the second line drawing are provided at different positions in a second direction which is perpendicular to the first direction, an obtaining unit configured to obtain length information of the first line drawing and length information of the second line drawing; and a setting unit configured to set the correction condition based on the length information of the first line drawing and the length information of the second line drawing, wherein the correction unit is configured to correct the image data using the correction condition according to a position of the second direction.

Further features of the present invention will become apparent from the following description of exemplary embodiments (with reference to the attached drawings).

BRIEF DESCRIPTION OF THE DRAWINGS

FIGS. 7A, 7B, 7C, 7D and 7E are table examples each illustrating relation of variation amount between a main scanning position and a sub-scanning position.

DESCRIPTION OF THE EMBODIMENTS

[First Embodiment]

Figure 1:
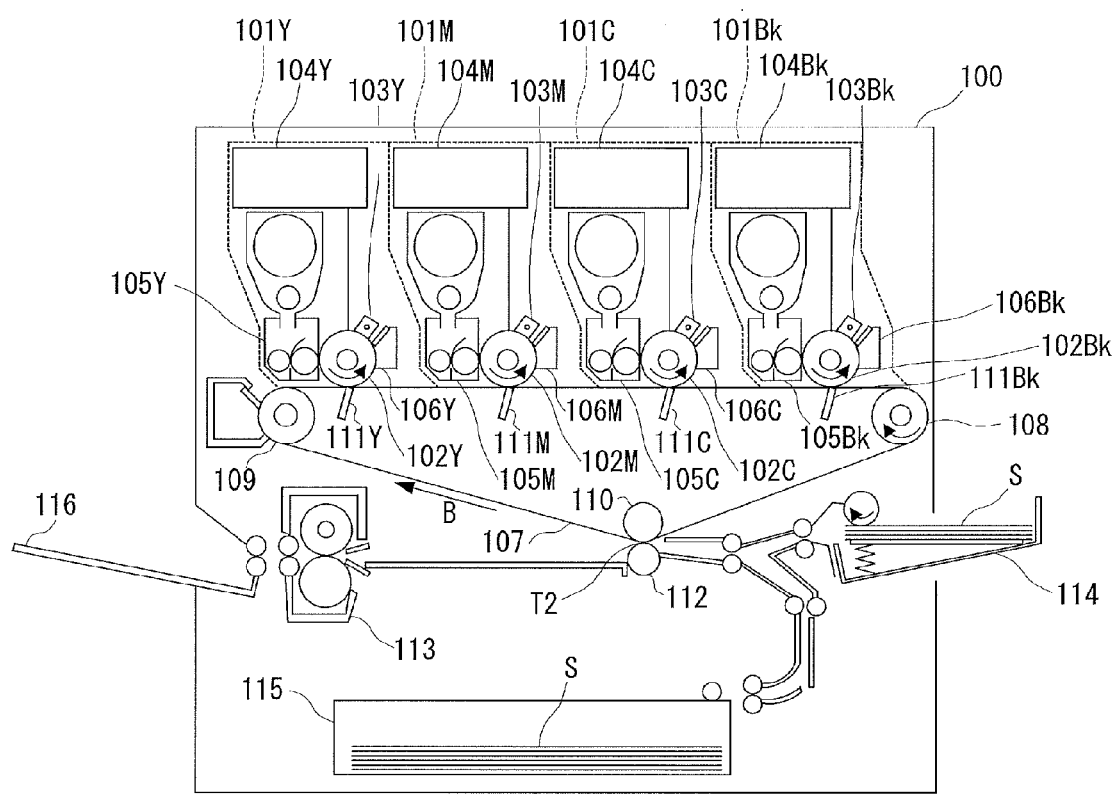
FIG. 1 is a schematic longitudinal cross-sectional view of an image forming apparatus.

FIG. 1 is a schematic longitudinal sectional view of a digital full color printer (image forming apparatus) which forms the image using toners of a plurality of colors. Note that this may be the image forming apparatus which forms the image with a monochromatic color (for example, black). An image forming apparatus 100 comprises four image forming sections (image forming means) 101Y, 101M, 101C and 101Bk, which form images of different colors. Here, the letters Y, M, C and Bk respectively represent yellow, magenta, cyan and black. The image forming sections 101Y, 101M, 101C and 101Bk respectively form images using yellow, magenta, cyan and black toners. The image forming sections 101Y, 101M, 101C and 101Bk respectively comprise photosensitive drums 102Y, 102M, 102C and 102Bk, which are photosensitive members. Charging devices 103Y, 103M, 103C and 103Bk are respectively provided around the photosensitive drums 102Y, 102M, 102C and 102Bk. Further, optical scanning devices 104Y, 104M, 104C and 104Bk and developing devices 105Y, 105M, 105C and 105Bk are respectively provided. Further, drum cleaning devices 106Y, 106M, 106C and 106Bk are respectively provided around the photosensitive drums 102Y, 102M, 102C and 102Bk.

Also, in the image forming apparatus 100, an intermediate transfer belt 107, formed into an endless shape, is arranged below the photosensitive drums 102Y, 102M, 102C and 102Bk. The intermediate transfer belt 107 is tensioned by a drive roller 108 and driven rollers 109 and 110. The intermediate transfer belt 107 rotates in a direction of an arrow B in FIG. 1 during the image formation. Further, primary transfer devices 111Y, 111M, 111C and 111Bk are provided at positions opposing to the photosensitive drums 102Y, 102M, 102C and 102Bk interposing the intermediate transfer belt 107 of an intermediate transfer member therebetween. The image forming apparatus 100 further comprises a secondary transfer roller 112 and a fixing device 113. The secondary transfer roller transfers toner image formed on the intermediate transfer belt 107 to a recording medium (for example, sheet) S. The fixing device 113 fixes the toner image transferred on the sheet S. Further, the image forming apparatus 100 comprises a manual feeding cassette 114, a feeding cassette 115 and a discharge part 116. Here, description is given with regard to an example of an image forming process, from a charging process to a development process, of the image forming apparatus 100. The image forming process performed in the respective image forming sections 101M, 101C and 101Bk is identical to each other. Therefore, in the following, on behalf of others, the image forming process in the image forming section 101Y is described.

The charging device 103Y in the image forming section 101Y charges the photosensitive drum 102Y. The photosensitive drum 102Y is a drum which rotationally drives when a driving force from a driving motor (not shown) is transmitted thereto. The charged photosensitive drum 102Y (image carrier) is exposed by a laser light which is emitted from the optical scanning device 104Y. As a result, an electrostatic latent image is formed on a rotating photosensitive member. Thereafter, the electrostatic latent image is developed by the developing device 105Y as a yellow toner image. The detail of the optical scanning device 104Y is described later.

Next, image forming processes after a transfer process will be described. The primary transfer devices 111Y, 111M, 111C and 111Bk apply the transfer bias to the transfer belt. As a result, the toner images formed on the photosensitive drums 102Y, 102M, 102C and 102Bk in each of the image forming sections are respectively transferred to the intermediate transfer belt 107 (primary transfer). In doing so, the toner images of each color are sequentially overlapped on the intermediate transfer belt 107. The toner images of the four colors, which are transferred onto the intermediate transfer belt 107, are again transferred onto the sheet S which is conveyed from the manual feeding cassette 114 or the feeding cassette 115 to a secondary transfer section T2 (secondary transfer). Then, the toner images on the sheet S are heated and fixed by the fixing device 116. Thereafter, the sheet S is delivered to the delivery part 116. Thus, the full-color image is formed on the conveyed recording medium. Note that toners remaining on the respective photosensitive drums 102Y, 102M, 102C and 102K, having finished the transfer, are removed by the drum cleaning devices 106Y, 106M, 106C and 106Bk. Thereafter, the image forming process is continued.

Figure 2:
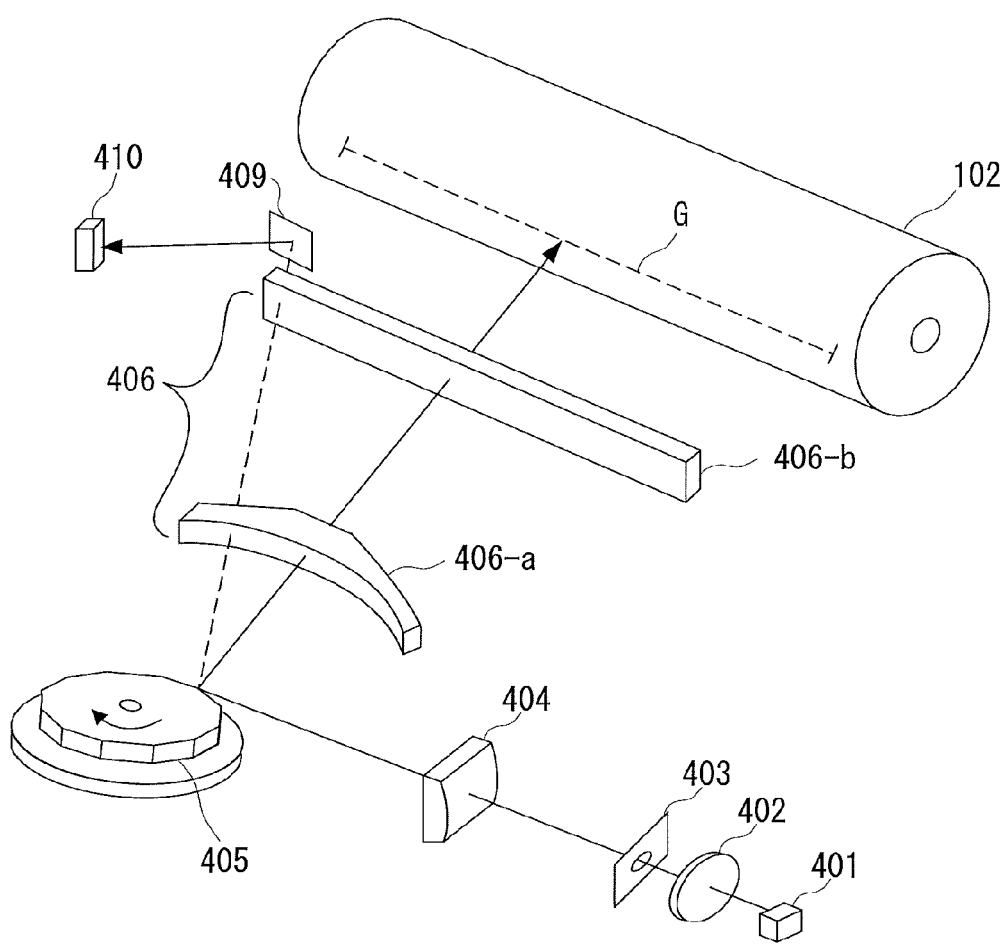
FIG. 2 is a diagram illustrating a configuration example of an optical scanning device.

FIG. 2 is a diagram illustrating a configuration example of an optical scanning device included in the image forming apparatus 100. The configuration of the optical scanning devices 104Y, 104M, 104C and 104Bk is identical to each other so that the indexes of Y, M, C and Bk, each representing a color, are omitted in the following description. The optical scanning device according to the present embodiment comprises a semiconductor laser 401, a collimator lens 402, a diaphragm 403, a cylindrical lens 404, a rotating polygon mirror (hereinafter referred to as polygon mirror) 405. The optical scanning device further comprises f-θ lens 406 (lens 406-a, lens 406-b), a reflector 409, and a beam detect sensor (hereinafter referred to as BD sensor) 410. The semiconductor laser 401 emits light beam based on a control signal from a sequence controller 411 (described later). The light beam emitted from the semiconductor laser 401 is turned into collimated beams to a center of an optical axis by passing through the collimator lens 402, the diaphragm 403, and the cylindrical lens 404. Then, the collimated beams enter a polygon mirror 405. The polygon mirror 405 rotates at constant angular speed by a driving force of a driving apparatus (not shown) in a direction of arrow shown in FIG. 2. The incident laser beam is turned into a deflected beam which continuously changes angles according to the rotation and is reflected. The light which is turned into the deflected beam is condensed by the f-θ lens 406 and scans on a surface of the photosensitive drum 102. The BD sensor 410 is provided at a position where the scanned light reflected by the reflector 409 enters. The BD sensor detects timing of the beams which scan by detecting timing at which the light enters.

Figure 3:
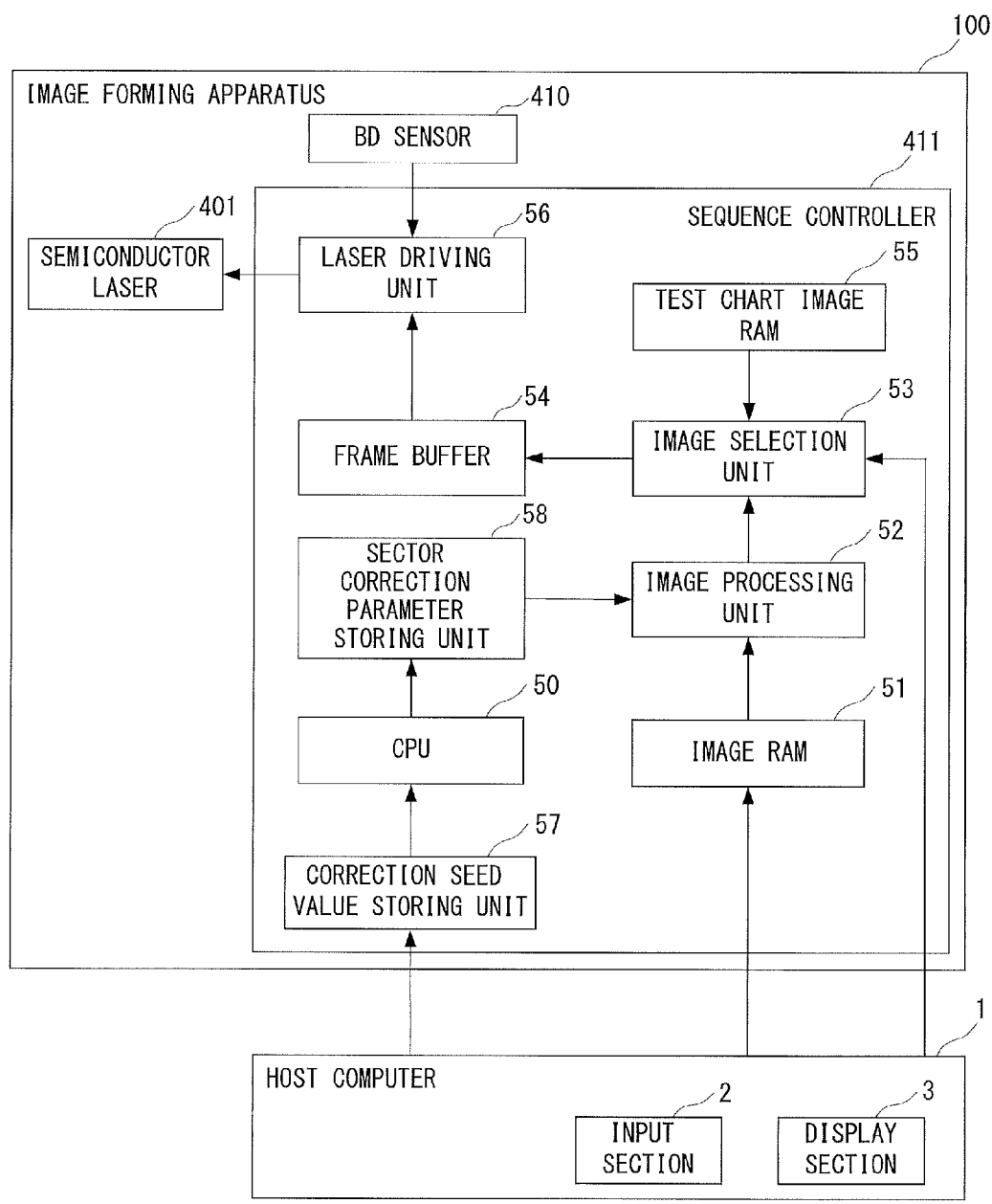
FIG. 3 is a diagram illustrating an example of functional block of sequence controller of a first embodiment.

FIG. 3 is a diagram illustrating an example of functional block of the sequence controller of the image forming apparatus 100. The configuration of the sequence controller of each color is identical to each other so that the indexes of Y, M, C and Bk, each representing a color, are omitted in the following description. Note that a host computer 1, as will be described later, is shared by each color. The sequence controller 411 comprises a central processing unit (CPU) 50, an image random access memory (RAM) 51, an image processing unit 52, an image selection unit 53, a frame buffer 54, a test chart image RAM 55, a laser driving unit 56, a sector correction seed value storing unit 57, and a sector correction parameter storing unit 58. The host computer 1 comprises an input section 2 and a display section 3. The input section 2 receives an operation input from a user. The display section 3 displays various information to the user. In the following, outline operation of each block is first described. Then, detailed description of the operation will be given.

The sequence controller 411 comprises a function to output print data received from the host computer 1, laser driving signals of a test image (test chart image) for measuring a sector deformation state and the like to a semiconductor laser 401. Note that, the image forming apparatus 100 comprises three functional modes, including "Normal print mode", "Test chart image print mode", and "Sector correction seed value input mode". The normal print mode is a mode where the image data input from the host computer 1 is converted into the image data which cancels the occurrence of distortion by the sector deformation (correction image data). Then, the image is printed. The test chart image print mode is a mode where the test chart image stored in the test chart image RAM 55 is printed without performing the sector correction processing. The image data of the test chart image is a set of pixels arranged in a main scanning direction and in a sub-scanning direction. The sector correction seed value input mode is a mode where receives an input of parameter used for the sector correction from the host computer 1 to the sector correction seed value storing unit 57.

When the image forming apparatus 100 is in the normal print mode, the host computer 1 sends the image data to be printed to the image RAM 51. Also, the host computer 1 sends a normal print mode signal to the image selection unit 53. When the image forming apparatus 100 is in the test chart image print mode, the host computer 1 sends a test chart image print mode signal to the image selection unit 53. When the image forming apparatus 100 is in the sector correction seed value input mode, the host computer 1 outputs the received sector correction seed value to the sector correction seed value storing unit 57.

Based on the sector correction seed value, the CPU 50 obtains the sector correction parameter (correction value), which is a correction condition to an entire image. The sector correction parameter as obtained is stored in the sector correction parameter storing unit 58. The RAM 51 stores the image data which is input from the host computer 1. When the image forming apparatus 100 is in the normal print mode, the image forming unit 52 performs image processing on the image data stored in the image RAM 51 based on the sector correction parameter stored in the sector correction parameter storing unit 58. As a result of the image processing, a correction image, which cancels the sector deformation at the time of the secondary transfer, is generated. When the image forming apparatus 100 is in the normal print mode, the image selection unit 53 stores the image data processed in the image processing unit 52 in the frame buffer 54. Further, when the image forming apparatus 100 is in the test chart image print mode, the image selection unit 53 reads the test chart image data stored in the test chart image RAM 55 to store in the frame buffer 54. The laser driving unit 56 obtains the image data corresponding to one scan from the frame buffer 54 in synchronization with the sensor input of the BD sensor. Then, the laser driving unit 56 converts the image data as obtained into the laser driving signal to output the semiconductor laser 401. Note that the functional block which operates when the image forming apparatus 100 is in the sector correction seed value input mode is the host computer 1 and the sector correction seed value storing unit 57.

Figure 4A:
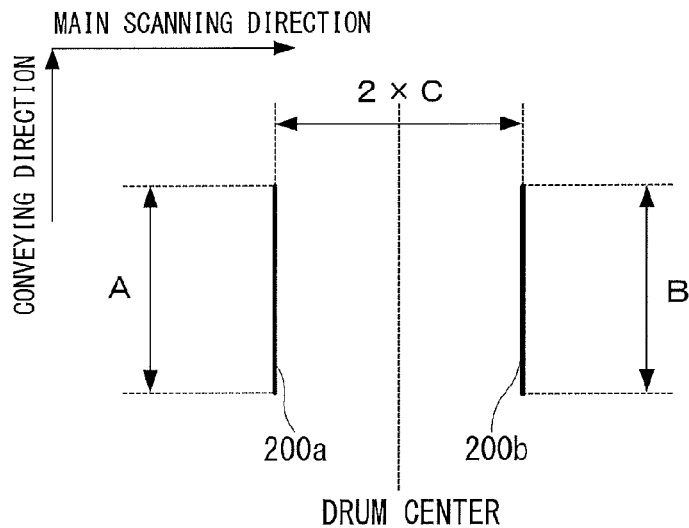
FIGS. 4A, 4B and 4C are diagrams each representing a shape of a test chart image.

FIG. 4 is a diagram schematically illustrating a shape of the test chart image stored in the test chart image RAM 55. Looking from the front of the test chart image shown in FIG. 4A, a left side straight image (line drawing) is defined as a side 200a. Similarly, a right side straight line (line drawing) is defined as a side 200b. As an example, the test chart image of the present embodiment is comprised of the side 200a and the side 200b. Here, a sheet S, which is a recording medium, is conveyed in a first direction. A second direction which is orthogonal to the first direction is defined as a main scanning direction. The main scanning direction is a direction in which the semiconductor laser scans. That is, the main scanning direction is a direction in which the photosensitive drum 102 is scanned. Further, the direction in which the sheet S is conveyed (first direction), that is, a direction which is orthogonal to the main scanning direction is defined as a sub-scanning direction. The test chart image in this case is a line drawing having a predetermined length in the sub-scanning direction, represented by the side 200a and the side 200b. Further, the positions of the side 200a and the side 200b in the main scanning direction on the photosensitive drum 102 (main scanning position) are symmetrically positioned with respect to the center position of the photosensitive drum 102 (drum center). That is, each of the side 200a and the 200b is formed at different positions in the second direction. In the following description, a test chart image in the sheet S whose relative position is known is used. In the test chart image, a length of the side 200a in the sub-scanning direction is defined as "A", a length of the side 200b in the sub-scanning direction is defined as "B", and a distance between the sides 200a and 200b is defined as "2xC". It means that, the test chart image has a first line drawing of the side 200a and a second line drawing of the side 200b. The first drawing is a linear image having a width A. The second line drawing is a linear image having a width B.

When an instruction to print the test chart image is received from the host computer 1, the image forming apparatus 100 prints the test chart image shown in FIG. 4A on the sheet S. For example, when the test chart image is printed by the image forming apparatus which does not cause the sector deformation at the time of the secondary transfer, the test chart image on the sheet S is formed into a shape shown in FIG. 4B. The side 200a in FIG. 4A corresponds to a side 201a in FIG. 4B. Further, the side 200b in FIG. 4A corresponds to a side 201b in FIG. 4B. Since the sector deformation does not occur, a length of the side 201a is "A". Also, a length in the side 201b is "B". Further, regardless of the occurrence or non-occurrence of the sector deformation, the distance between the sides 201a and 201b remains "2XC". That is, the relative position of the test chart image in the sheet S does not change.

Figure 4B:
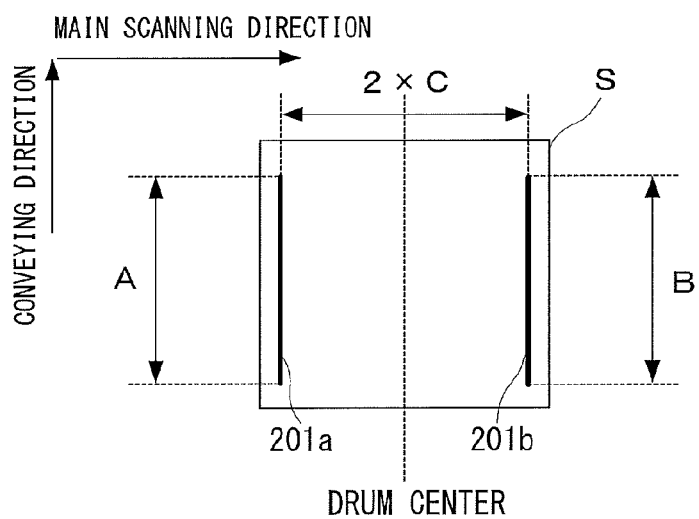
Figure 4C:
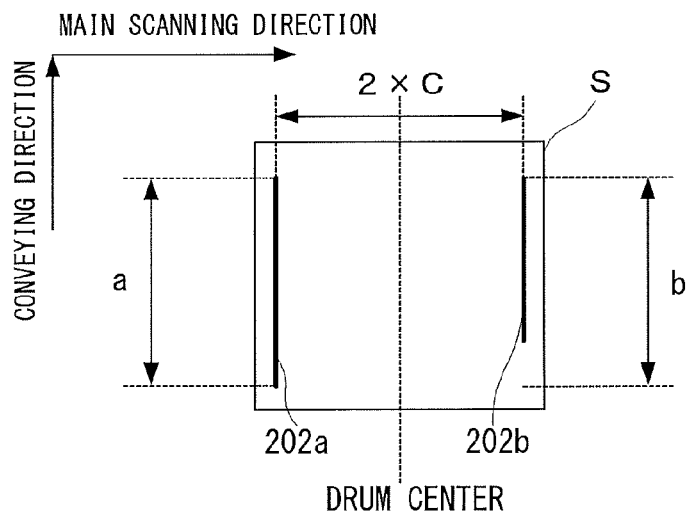

Further, for example, when the test chart image shown in FIG. 4A is printed by the image forming apparatus which causes the sector deformation at the time of the secondary transfer, the test chart image on the sheet S is formed into a shape shown in FIG. 4C. The side 200a in FIG. 4A corresponds to a side 202a in FIG. 4C. Further, the side 200b corresponds to a side 202b in FIG. 4C. In this case, since the sector deformation occurs, at least one of the lengths of the side 202a and the side 202b is changed from a state shown in FIG. 4A. That is, the relative position of the test chart image in the sheet S is changed. Here, as shown in FIG. 4B, a length of the side 202a is defined as "a". Also, a length of the side 202b is defined as "b". Note that, the "a" and "b", which are the lengths of the side 202a and the side 202b individually, are different for each image forming apparatus. Further, the distance between the sides 202a and 202b remains "2xC".

Figure 5:
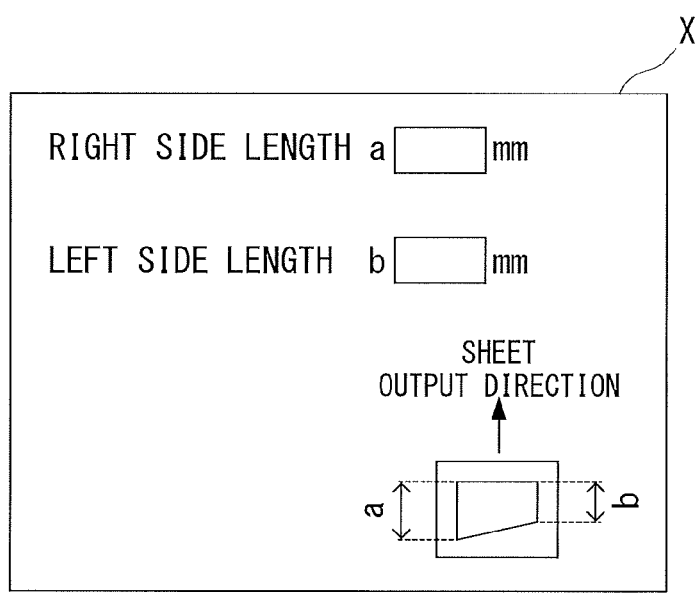
FIG. 5 is a diagram illustrating an example of a sector correction seed value input screen.

FIG. 5 is a diagram illustrating an example of the sector correction seed value input screen for receiving input of the correction seed value. When it is in the sector correction seed value input mode, a sector correction seed value input screen x as shown in FIG. 5 is displayed on the display section 3 of the host computer 1. The sector correction seed value input screen X comprises an "Input box a" and an "Input box b". In the "Input box a", a left side length of the test chart image formed on the sheet S as measured is input. In the "Input box b", a right side length of the same is input. In the input box a, a value for "a", which is the length of the side 202a of the first line drawing is input. In the input box b, a value for "b", which is the length of the side 202b of the second line drawing is input. The respective values are the sector correction seed values (a, b). The sector correction seed value as input is associated with the respective main scanning directions of the side 202a and the side 202b, which, then, are stored in the sector correction seed value storing unit 57. Further, to facilitate user's input operation, schematic diagram is also shown on the sector correction seed value input screen X, with reference to the sheet output direction (sheet conveyance direction), below each input box. In the diagram, each side a and b is associated with each input box a and b, which helps the user to easily input the measured value to the appropriate input box.

Note that, in the schematic diagram which is shown at the right side looking from the front of the sector correction seed value input screen X, the left side length a is longer than the right side length b. This is an illustration to facilitate the user's input operation so that, in some cases, the left side length a as measured is shorter than the right side length b as measured. The present embodiment is described for a case where the sector correction seed value is input by the user. Further, alternatively, each length of the first line drawing and the second line drawing of the test chart image formed by printing may be detected by the sensors and the detection result may automatically be input, or obtained as the sector correction seed value.

Figure 6:
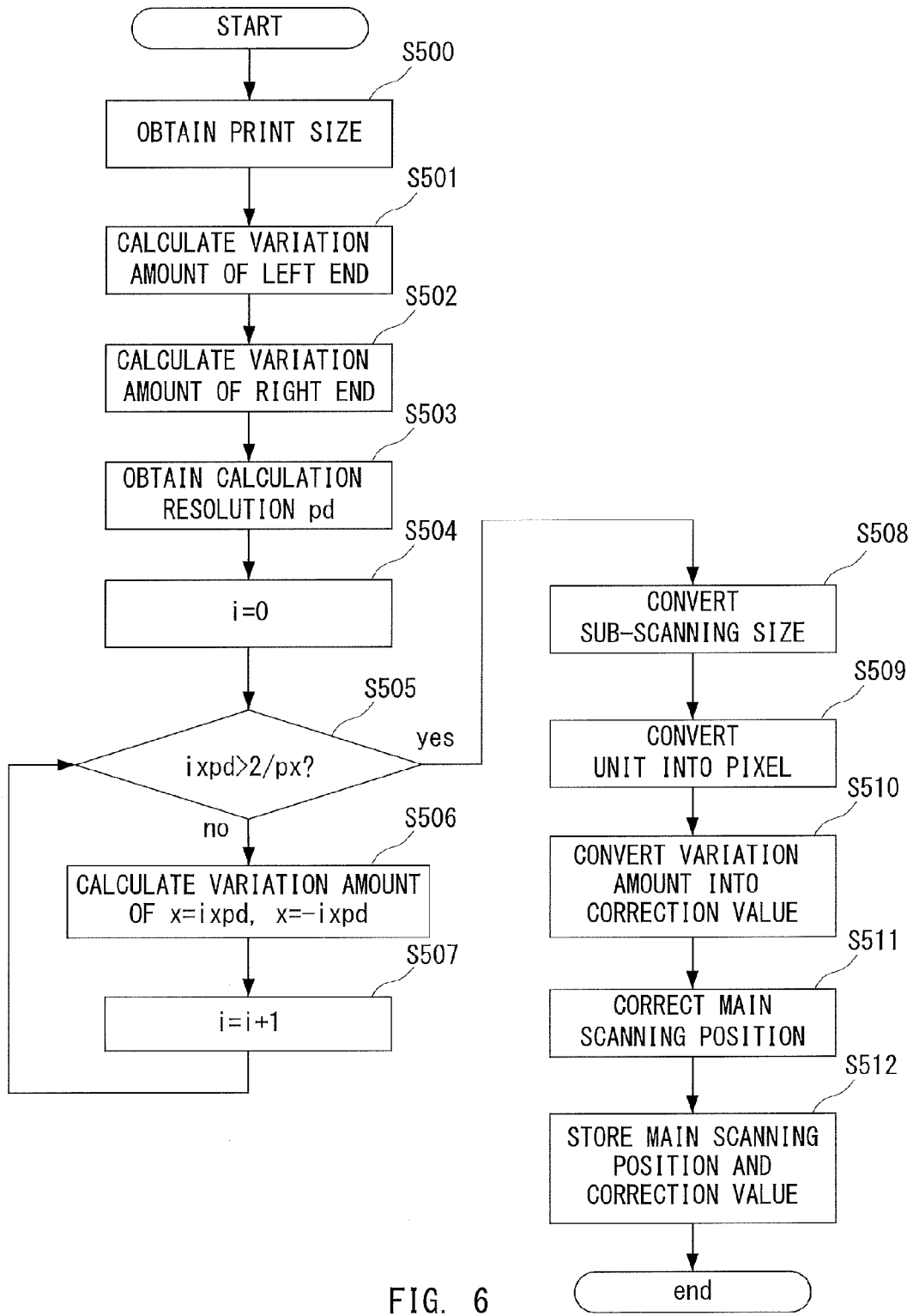
FIG. 6 is a flow test chart illustrating a processing procedure of how to obtain a sector correction parameter.

FIG. 6 is a flowchart illustrating an example of a processing procedure of how to obtain the sector correction parameter based on the sector correction seed value. The CPU 50 obtains a size of the sheet on which the image is printed, from the host computer 1 (S500). The size of the sheet S is, for example, A4 size, B4 size and the like, which are previously stored in a storing unit (not shown). In the present embodiment, description is given for a following case: px=325 [mm], where px represents a length of the sheet S of the main scanning direction (the second direction), that is, main scanning length; py=210 [mm], where py represents a length of the sheet S of the sub-scanning direction (the first direction), that is, sub-scanning length. Further, a left end of the sheet S, which is parallel to the sub-scanning direction is defined as a left side. Also, a right end of the sheet S, which is parallel to the sub-scanning direction is defined as a right side. Note that, the CPU works as a setting unit which sets a correction condition. In particular, the CPU 50 obtains the length information of the first and the second line drawings and sets the correction condition based on the obtained information. Description is given in detail in the following.

The CPU 50 obtains a variation amount of the left side of the sheet S (S501). For example, a center position of the photosensitive drum 102 is defined as a main scanning position "0 (zero)". Further, as shown in FIG. 4A, the sub-scanning length of the left side of the test chart image is defined as "A". Also, the sub-scanning length of the right side of the test chart image is defined as "B". Further, the main scanning position of the side 202a in FIG. 4C is defined as "−C" ("−" represents negative. The same applies hereinafter). The main scanning position of the side 202b is defined as "+C"("+" represents positive. The same applies hereinafter.). Note that, a direction in which the respective lengths of the side 202a and the side 202b are extended to the sub-scanning length A is defined as "positive". Similarly, a direction in which the respective lengths of the side 202a and the side 202b are reduced to the sub-scanning length A is defined as "negative". Further, in this case, the variation amount of the side 202a of the sub-scanning direction at the main scanning position −C is expressed by "a−A". It means that, the variation amount is a difference (distortion amount) obtained by subtracting "A", which is the sub-scanning length of the left side of the test chart image, from "a", which is the length of the side 202a. Further, the variation amount of the side 202b of the sub-scanning direction at the main scanning position +C is expressed by "b−A". It means that, the variation amount is a difference (distortion amount) obtained by subtracting "B", which is the sub-scanning length of the left side of the test chart image, from "b", which is the length of the side 202b. Such variation amounts of the sub-scanning length at each main scanning position on the sheet S are obtained by performing linear interpolation using the two points, the main scanning position −C and the main scanning position +C. Thus, the variation amount y of the sub-scanning length at the main scanning position x is expressed by a following expression 1.

$$y(x) = [((b-B)-(a-A))/(2*C)]*(x+C)+(a-A) \quad \text{(expression 1)}$$

The variation amount of the left side of the sheet S is obtained by substituting "x=−px/2" into the expression 1. The CPU 50 obtains variation amount of the right side of the sheet S (S502). In particular, the variation amount is obtained by substituting "x=px/2" into the expression 1.

Each processing from Steps S503 to S507 is the processing to obtain the variation amount of the sub-scanning length at each main scanning position other than the right end and the left end of the sheet S. The CPU 50 obtains a calculation resolution pd[mm] corresponding to the main scanning position x (S503). The calculation resolution pd is previously determined in the image forming apparatus 100. In the present embodiment, description is given on the basis that the calculation resolution pd is 20 [mm]. Note that, as the value of the calculation resolution pd is decreased, the quality of the image obtained after the sector correction processing is increased. The CPU 50 substitutes "i=0" into a counter i to initialize the counter (S504). The CPU 50 determines whether a flow at the main scanning position other than the right end and the left end of the sheet S is finished or not (S505). For example, if a condition of "i*pd>2/px" is satisfied, the variation amount y is obtained at the main scanning position where exceeds the sheet size. Thus, if this condition is satisfied, the CPU 50 determines that the flow is finished (S505: yes). Then, the CPU 50 proceeds to processing of Step S508. Also, if it is determined that the flow is not yet finished (S505: no), the CPU 50 obtains the variation amount y of the sub-scanning length at each of the main scanning positions x=i*pd, and x=−i*pd (S506). The CPU 50 adds 1 to the value of the counter i (S507). Thereafter, the CPU 50 returns to the processing of Step S505.

The CPU 50 converts the variation amount y, obtained through each processing from Steps S503 to S507, into variation amount of the sub-scanning length of the image formed on the sheet S (S508). As to the obtained respective variation amounts y, for example, the variation amount y', which is the variation amount of the image of the sub-scanning length py is expressed as follows: y'=y*py/A. It means that, in each processing from Steps S503 to S507, in the test chart image in which the relative position in the sheet S is known, the variation amounts of the sub-scanning length in the test chart image having the sub-scanning length A are obtained for every main scanning position of the sheet S. In the processing of Step S508, the variation amount of the sub-scanning direction in the image to be printed is obtained using the variation rate. The CPU 50 converts the main scanning position and the variation amount of the sub-scanning length corresponding to the main scanning position into a unit in pixel [pix] (S509). In the present embodiment, an image resolution is, for example, 2400 dpi, and the number is rounded off to the decimal point.

The CPU 50 converts the variation amount of the sub-scanning length to obtain a correction condition (sector correction parameter) of the sub-scanning length (S510). In particular, the CPU 50 multiplies the value of the variation amount y of the sub-scanning length by "−1" to obtain the correction amount. The CPU 50 corrects the main scanning position such that the left end is the zeroth image. In particular, a value at the main scanning position of the left end is subtracted from the value of each main scanning position. The CPU 50 stores each value obtained in the processing of Step S511 in the sector correction parameter storing unit 58 as the sector correction parameter, which is the correction condition (S512).

FIGS. 7A to 7E show examples of tables, each showing the corresponding relation of the main scanning position and the variation amount of the sub-scanning length in the processing of Steps S500 to S512. Further, each value shown in FIGS. 7A to 7E is an example of a following case:

left side length A of the test chart image: 200 [mm];
right side length B of the test chart image: 200 [mm];
main scanning position −C of the side 202a (FIG. 4C): −120 [mm]; and
main scanning position +C of the side 202b: +120 [mm].

It is also an example in a case where: sector correction seed value a as an input in the input box a is 200.5 [mm], and sector correction seed value b as an input in the input box b is 199.5 [mm]. Note that the main scanning length of the sheet S is 325 [mm].

The table shown in FIG. 7A shows relation of the main scanning position and the variation amount of the sub-scanning length when it is determined "yes" in the processing of Step S505. It means that, in FIG. 7A, the variation amounts of the sub-scanning length at each main scanning position obtained in each processing from Steps S503 to S507 are shown. The main scanning length of the sheet S is 325 [mm] so that the main scanning position is from −162.5 to 162.5. Note that the main scanning position, −162.5 [mm], represents the left end of the sheet S. Also, the sub-scanning position, 162.5 [mm], represents the right end of the sheet S. The table shown in FIG. 7B shows the relation of the main scanning position and the variation amount of the sub-scanning length after the processing of Step S508. In the table shown in FIG. 7B, the value of each variation amount shown in FIG. 7A is converted into the value of the variation amount in the image having the sub-scanning length py. The table shown in FIG. 7C shows the relation of the main scanning position and the variation amount of the sub-scanning length after the processing of Step S509. In the table shown in FIG. 7C, each value shown in FIG. 7B is converted into a unit in pixel [pix], in which case, the image resolution is 2400 dpi. The table shown in FIG. 7D shows the relation of the main scanning position and the variation amount of the sub-scanning length after the processing of Step S510. In the table shown in FIG. 7D, each variation amount shown in FIG. 7C is converted into the correction value. The table shown in FIG. 7E shows relation of the main scanning position and the variation amount of the sub-scanning length after the processing of Step S511. In the table shown in FIG. 7E, the main scanning position shown in FIG. 7D is corrected such that the left end is the zeroth image (main scanning position 0). It means that, in the processing of Step S512, each value shown in FIG. 7E is stored in the sector correction parameter storing unit 58 as the sector correction parameter, which is the correction condition.

Figures 8, 9, 10:
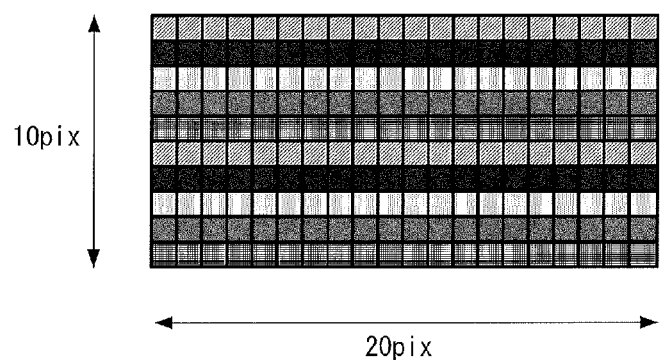
FIG. 8 is a diagram illustrating an example of a sector correction parameter.
FIG. 9 is a diagram illustrating an example of image data.
FIG. 10 is a diagram illustrating a corresponding relation between the sector correction parameter and a corresponding area.

Here, the image processing performed in the image processing unit 52 is described. For convenience of explanation, in this embodiment, the sector correction parameter shown in FIG. 8 is stored in the sector correction parameter storing unit 58. Also, the image data shown in FIG. 9, having the main scanning length of 20 pixels and the sub-scanning length of 10 pixels, are stored in the image RAM 51, in this embodiment. The image processing unit 52 divides the image data into each area by the main scanning position [pix] of the sector correction parameter shown in FIG. 8. The main scanning positions of the sector correction parameters are, as shown in FIG. 8, 0, 4, 8, and 16 [pix]. Thus, the image data is divided into the following areas 0 to 4. The area 0 includes 0th to 3rd pixels of the main scanning direction; the area 1 includes 4th to 7th pixels; the area 2 includes 8th to 11th pixels; the area 3 includes 12th to 15th pixels; and the area 4 includes 16th to 19th pixels. FIG. 10 shows the corresponding relation of the sector correction parameter of the correction condition and the area.

Figure 11A:
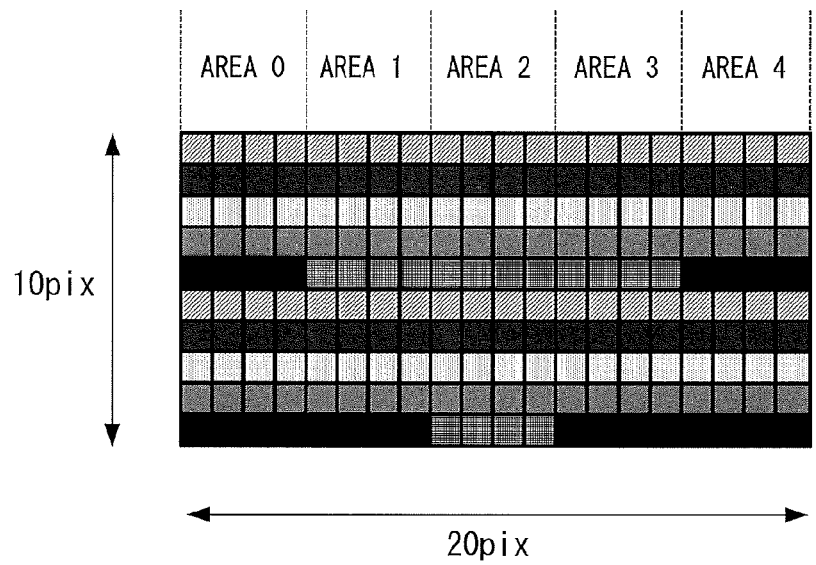
FIG. 11A is a diagram illustrating pixels to perform magnification processing.

The image processing unit 52 identifies the pixel to perform magnification processing for every divided area. By dividing the sub-scanning length by an absolute value of the correction value for every area, the pixel to which the magnification processing is performed is identified. For example, in a case of the zeroth pixel of the main scanning position, the sub-scanning length of 10 pixels is divided by 2, which is the absolute value of the correction value. Then, pixel of one line for every five pixel is identified as the pixel to perform the magnification processing. Note that if the correction value is "0", it is deemed that the area has no pixel to perform the magnification processing. As a result, the pixel in all black shown in FIG. 11A is the pixel as identified to perform the magnification processing.

Figure 11B:
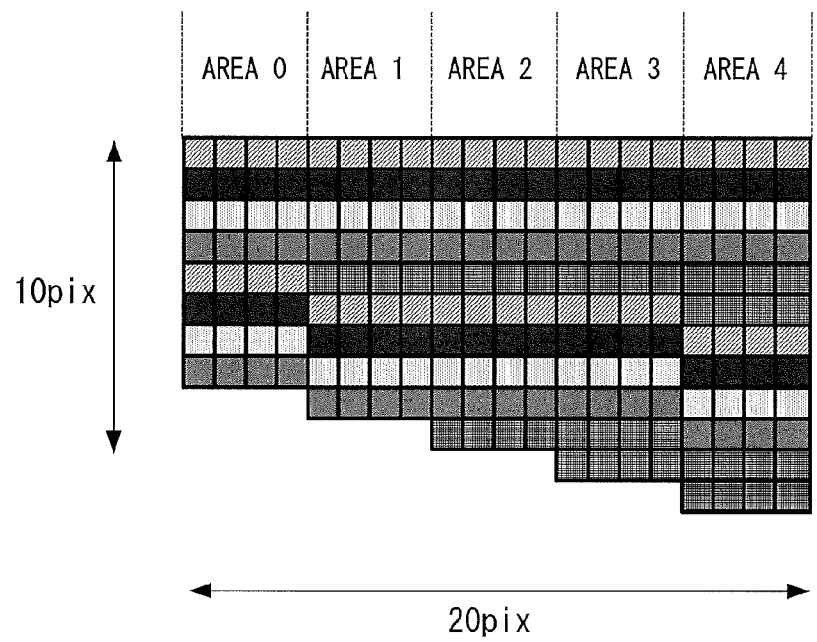
FIG. 11B is a diagram illustrating image data after the magnification processing.

The image processing unit 52 performs the image processing to the pixels subjected to be the magnification processing. If the correction value (FIG. 8) is negative, the image processing unit 52 removes the target pixel to close up the pixel by one line in the sub-scanning direction. That is, a part of the image is removed at a specified position by the correction value. Further, if the correction value is positive, the image processing unit 52 copies the target pixel in the sub-scanning direction to shift the pixel behind the copied pixel by one line in the sub-scanning direction. That is, a part of the image is inserted at a specified position by the correction value. The image data, shown in FIG. 11B, represents the correction image data after performing the magnification processing to the areas 0 to 4. In this embodiment, the image processing as above is performed to the image data stored in the image RAM 51 based on the correction condition (sector correction parameter) shown in FIG. 7E to generate a correction image. For example, when forming an image on a sheet having the main scanning length of 325 [mm], an image data consisting of the main scanning length of 30709 pixels is stored in the image RAM 51.

As mentioned, the image forming apparatus 100 of the present embodiment obtains the correction condition (sector correction parameter) by the CPU 50 according to the difference (distortion amount) between the sides 202a and 202b of the test chart image and the sides 202a and 202b of the test chart image as output. Based on the correction condition as obtained, the image forming apparatus 100 generates the correction image for cancelling the distortion due to the sector deformation. Thus, the constituting parts to detect the output image can be largely reduced, which reduces the manufacturing cost. Further, with a simple operation of inputting two parameters, (sector correction seed values a, b) the user can obtain the printings in which the occurrence of the defective image by the sector deformation is avoided. Further, even in a case where the image is printed on a sheet having the size different from the sheet used to output the test chart image, in accordance with the image size as printed, the correction image for cancelling the occurrence of the distortion by the sector deformation can be generated. Therefore, only one set of the parameter is applicable to the sheet of various sizes.

Note that description has been given in a case where the calculation resolution pd is 20 [mm], however, the value is not limited to this. The value of the calculation resolution can be changed according to the image quality required by the image forming apparatus. For example, the calculation resolution pd can be changed according to the respective difference in length between the left side and the right side after printing. Further, for the convenience of description, the main scanning positions of the left side and the right side of the test chart image is symmetrically arranged from the center position of the drum. For example, when it is not symmetrically arranged, the main scanning position information of the respective right and left sides may be input from the host computer 1 as the sector correction seed value. Also, the test image may be any other image as long as it has a plurality of line drawings extending in the sub-scanning direction at different positions of the main scanning direction. For example, the test image may include the line drawings extending in the main scanning direction.

[Second Embodiment]

Figure 12:
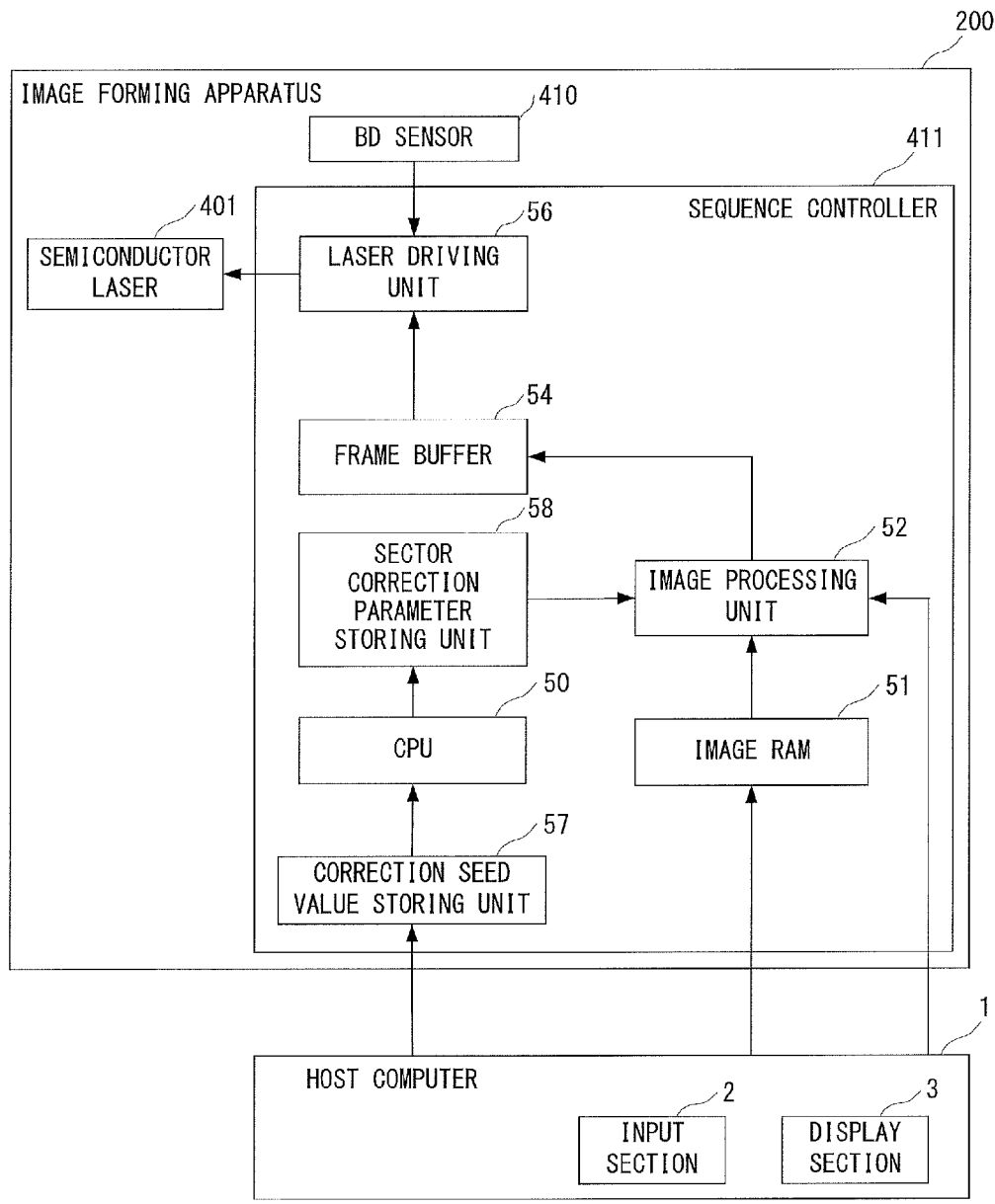
FIG. 12 is a diagram illustrating an example of a functional block of a sequence controller of a second embodiment.

In the present embodiment, description is given with regard to an image forming apparatus which can correct the sector deformation even in a case where the test image (test chart image) is not included in the image forming apparatus. Note that the same symbols are used for the parts overlapping with those of the first embodiment and the description thereof is omitted. FIG. 12 is a diagram illustrating an example of functional block of the sequence controller of the image forming apparatus 200 according to the present embodiment. The sequence controller does not have the image selection unit 53 and the test chart image RAM 55, which is the different from the sequence controller of the image forming apparatus 100 as described in the first embodiment. Therefore, the operation of the image processing unit differs as compared to that of the first embodiment. In the following, the operation of the image processing unit 52 in the present embodiment is described in detail.

When the image forming apparatus 100 is in the normal print mode, the image processing unit 52 performs image processing of the image data stored in the image RAM 51 based on the correction condition (sector correction parameter) stored in the sector correction parameter storing unit 58. As a result of the image processing, a correction image which can cancel the sector deformation at the time of the second transfer can be generated. Further, when the image forming apparatus 100 is in the test chart image print mode, the image processing unit 52 does not perform any image processing but stores the input image from the host computer 1 to the frame buffer 54 as it is.

Figure 13A:
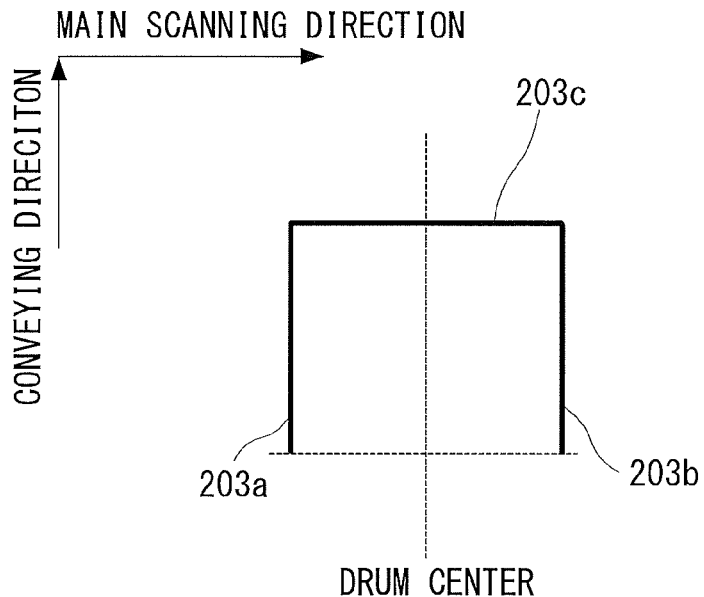
FIGS. 13A and 13B are image examples to be printed to obtain a sector correction seed value.
Figure 13B:
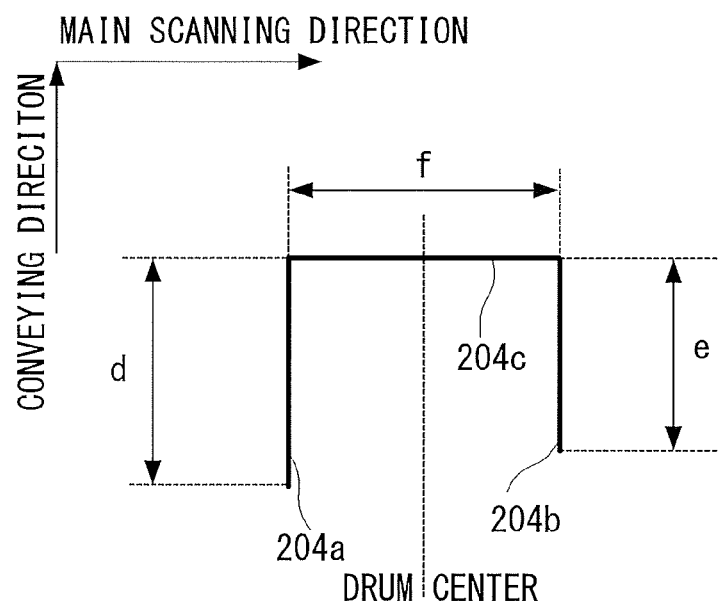

FIGS. 13A and 13B illustrates an image example to be printed to obtain the sector correction seed value instead of the test chart image of the first embodiment. This image example is different from the test chart image as described in the first embodiment in that it is not stored in the image forming apparatus in advance. However, like the test chart image as described in the first embodiment, the image example is also used for obtaining the sector correction seed value. Looking from the front of the image as shown in FIG. 13A, a left side linear image, which is parallel in the sub-scanning direction, is defined as a side 203a (first line drawing). Also, similar to that of a right side linear image is defined as a side 203b (second line drawing). Further, a linear image which is parallel in the main scanning direction (second direction) is defined as a side 203c (third line drawing). The lengths of the side 203a and the side 203b are identical. Also, both the sides 203a and the side 203b are orthogonal to the side 203c. It means that, the third line drawing is a line segment which represents a distance between the two line drawings, i.e., the first line drawing and the second line drawing. Further, the main scanning position of the side 203a and the side 203b is symmetrically positioned with respect to the center position of the photosensitive drum 102. The user inputs image data, in which the printed image shown in FIG. 13A is scanned, to the image forming apparatus 200 via the host computer 1. The user switches to the test chart image print mode and instructs to print the input image data. Due to this, printing is performed in a state where the image processing is not performed by the image processing unit 52.

FIG. 13B shows an example of the printing result in a case where the image shown in FIG. 13A is printed in the image forming apparatus which causes the sector deformation at the time of the secondary transfer. The side 203a in FIG. 13A corresponds to a side 204a in FIG. 13B. Further, the side 203b in FIG. 13A corresponds to a side 204b in FIG. 13B. The side 203c in FIG. 13A corresponds to a side 204c in FIG. 13B. Due to the occurrence of the sector deformation, the length of the side 204a as formed differs from the length of the side 204b as formed. As shown in FIG. 13B, the length of the side 204a is defined as "d" (sub-scanning length d). Also, the length of the side 204b is defined as "e" (sub-scanning length e). Note that, the "d" and "e", which are the lengths of the side 204a and the side 204b individually are different for each image forming apparatus. Further, a distance between the sides 204a and 204b, that is, a length of the side 204c is defined as "f".

Figure 14:
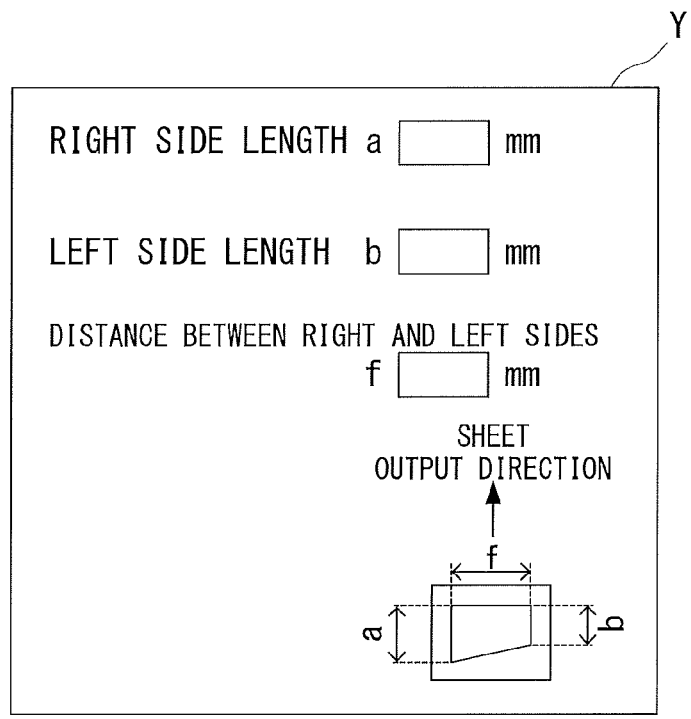
FIG. 14 is a diagram illustrating an example of a sector correction seed value input screen in the second embodiment.

FIG. 14 is a diagram illustrating a sector correction seed value input screen for receiving input of the correction seed value in the present embodiment. When it is in the sector correction seed value input mode, a sector correction seed value input screen y as shown in FIG. 14 is displayed on the display section 3 of the host computer 1. In the "input box a", in which the left side length is input, on the sector correction seed value input screen Y, the user inputs a value of "d", which corresponds to the length of the side 204a. In the "input box b", in which the right side length is input, the user inputs a value of "e", which corresponds to the length of the side 204b. In the "input box f", in which the distance between the right side and the left side is input, the user inputs a value of "f", which corresponds to the length of the side 204c. Each value input by the user is respectively stored in the sector correction seed value storing unit 57 as the sector correction seed value.

Note that, in the schematic diagram which is shown at the right side looking from the front of the sector correction seed value input screen Y, the left side length a is shown longer than the right side length b. This is an exemplary embodiment to facilitate the user's input operation so that, in some cases, the left side length a as measured is shorter than the right side length b as measured. The description of the present embodiment is a case where the sector correction seed value is input by the user. Alternatively, three sides of the printed image shown in FIG. 13B may be detected by the sensors and the detection result may automatically be input as the sector correction seed value.

Figure 15:
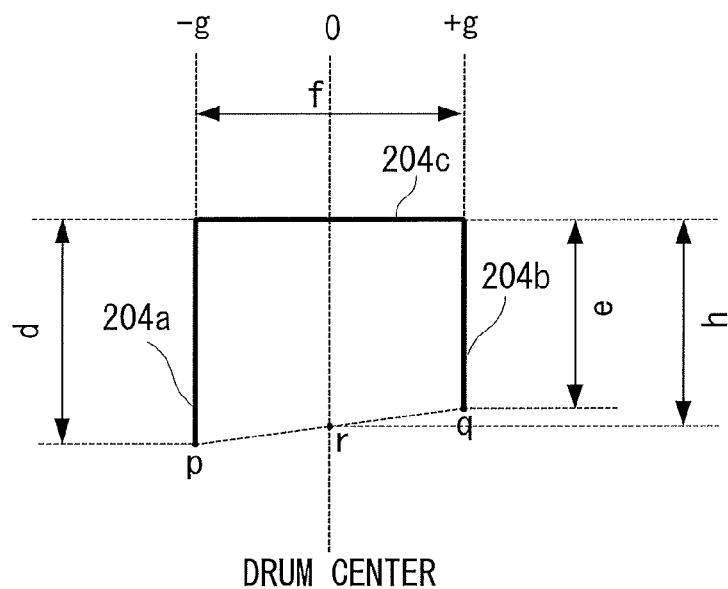
FIG. 15 is a flow chart illustrating a processing procedure of how to obtain a sector correction parameter in the second embodiment.
Figure 16:
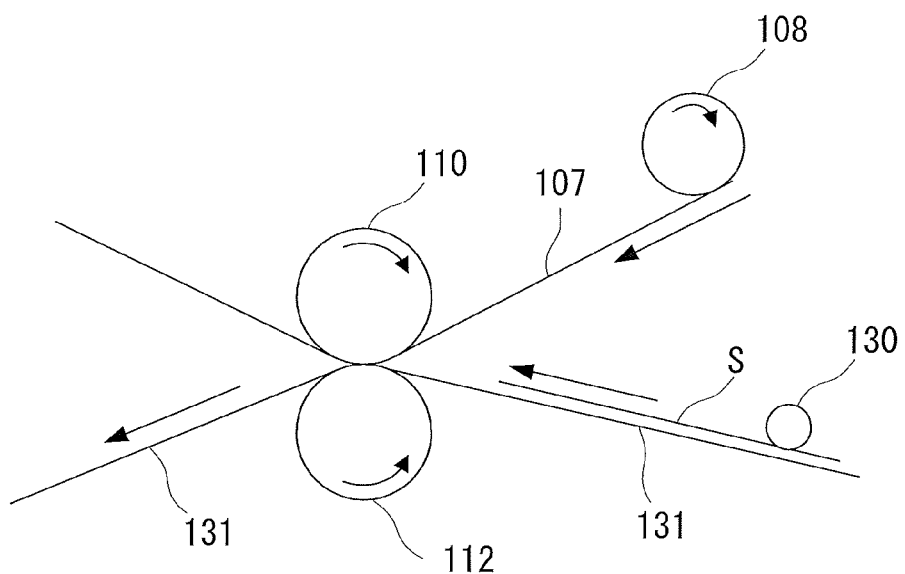
FIG. 16 is a diagram for explaining a secondary transfer mechanism.
Figure 17A:
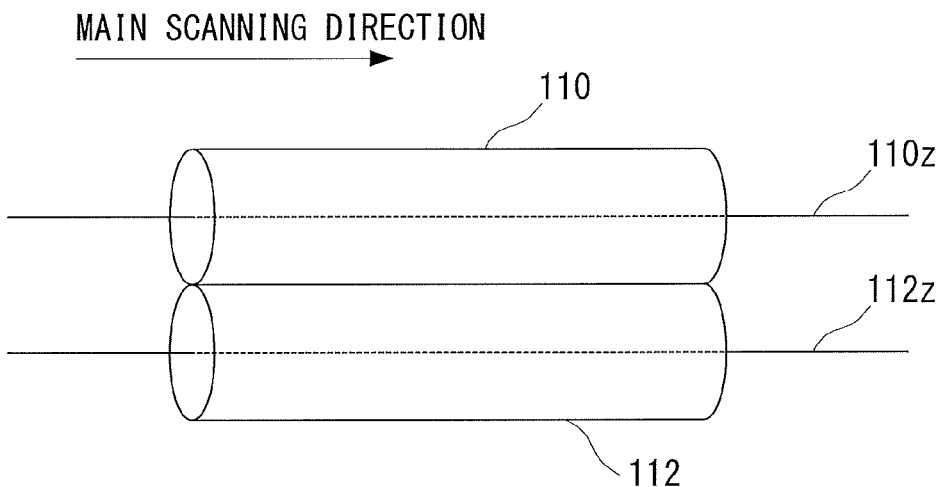
FIG. 17A is a diagram for explaining an arrangement of a driven roller and a secondary transfer roller when the intermediate transfer belt moves at the same speed at which a sheet is conveyed.
Figure 17B:
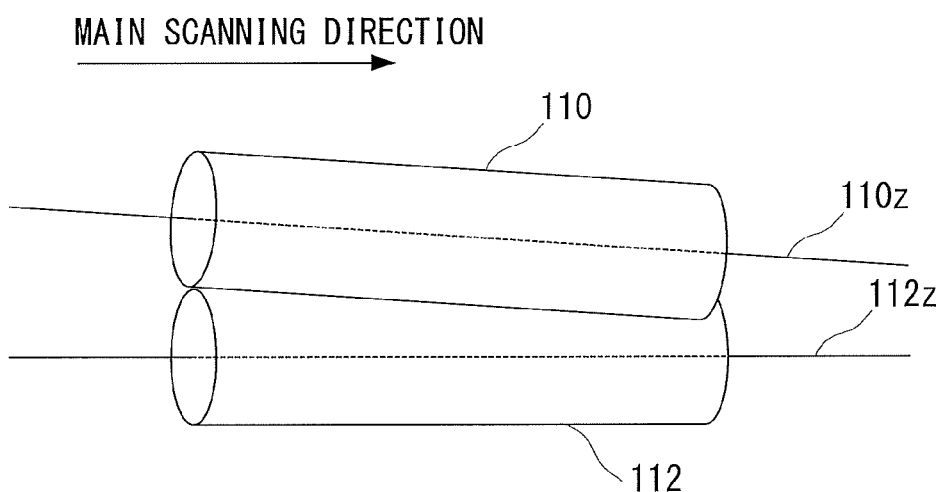
FIG. 17B is a diagram for explaining an arrangement of a driven roller and a secondary transfer roller when the intermediate transfer belt does not move at the same speed at which a sheet is conveyed.
Figure 18A:
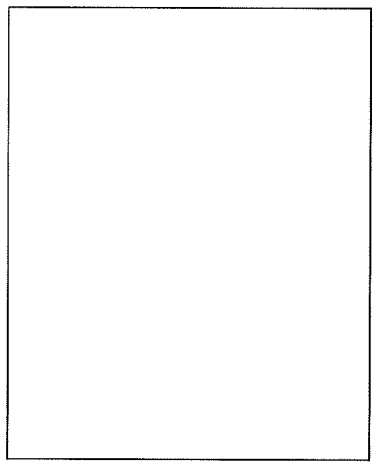
FIG. 18A is a diagram illustrating an example of image.
Figure 18B:
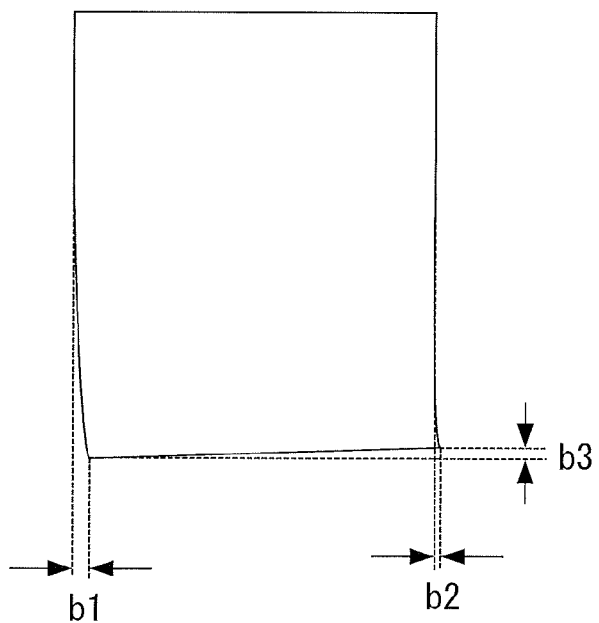
FIG. 18B is a diagram illustrating a situation where a shape of the image in FIG. 18A is printed in a distorted shape.

In the following, description is given with regard to a processing procedure of how to obtain, by the CPU 50, the correction condition (sector correction parameter) based on the sector correction seed value. Note that, in the present embodiment, the following processing is performed instead of the processing from Steps S500 to S502 (FIG. 6) as described in the first embodiment. FIG. 15 is a diagram for explaining the processing procedure of how to obtain the sector correction parameter. For example, as shown in FIG. 15, a center of the photosensitive drum 102 is defined as the main scanning position "0". The main scanning position of the side 204a is defined as "−g". The main scanning position of the side 204b is defined as "+g". Further, a rear end position of the sub-scanning direction of the side 204a is defined as "p". Also, a rear end position of the sub-scanning direction of the side 204b is defined as "q". Further, a length in the sub-scanning direction (sub-scanning length) at the main scanning position 0 is defined as "h". Note that, the sub-scanning length h is a length connecting from a point of the main scanning position 0 on the side 204c to a point where a perpendicular line of the side 204c at the main scanning position 0 intersects a line connecting the rear end position p and the rear end position q.

In the present embodiment, the CPU 50 performs the sector correction with reference to the sub-scanning length h at the center of the photosensitive drum 102 (main scanning position 0). It means that the correction value is obtained on the basis that the variation amount is 0 (zero) at the main scanning position 0. A direction in which the lengths of the sub-scanning length d and the sub-scanning length e respectively are extended to the sub-scanning length h is defined as "positive". Similarly, a direction in which the respective length of the sub-scanning length d and the sub-scanning length e is reduced to the sub-scanning length h is defined as "negative". The variation amounts of the sub-scanning length at each main scanning position on the photosensitive drum 102 are obtained by performing linear interpolation using the two points, the main scanning position −g and the main scanning position +g. Thus, the variation amount y of the sub-scanning length at the main scanning position x is expressed by a following expression 2.

$$y(x)=[((e-h)-(d-h))/(2*g)]*(x+g)+(d-h) \quad \text{(expression 2)}$$

Here, an element g of the expression 2 is g=f/2. Also, an element h of the expression 2 is h=(e+d)/2.

As mentioned, in the image forming apparatus 200 of the present embodiment, in a case where the test chart image is not included in the image forming apparatus, the variation amount of the sub-scanning length at the center of the photosensitive drum 102 (main scanning position 0) is set to 0 (zero). Based on this, according to the difference in length between the sides 204*a* and 204*b* of a predetermined image, the CPU 50 obtains the sector correction parameter, which is the correction condition, to cancel the distortion caused in the sub-scanning direction of the image to be printed. Based on the correction value, the image forming apparatus 200 generates the correction image to cancel, by the image processing unit 52, the occurrence of the distortion by the sector deformation. This eliminates the need for the constituting parts used to store the test chart image so that the manufacturing cost can further be reduced. Further, with a simple operation of inputting three parameters (i.e., sector correction seed values), the user can obtain the printings in which the occurrence of the defective image by the sector deformation is avoided.

In the image forming apparatus 200, the sector correction is performed with reference to the center of the photosensitive drum 102. For example, a sheet having the main scanning length of 330 [mm] is used. When the variation amount of the sub-scanning length at the main scanning position −165 [mm] is 64 pixels, the variation amount of the sub-scanning length at the main scanning position 165 [mm] is −64 pixels. By equally distributing the variation amount in the right and left, a width of the max value and the minimum value of the variation amount of the whole page can be suppressed. For example, the larger the absolute value of the variation amount is, the larger the original image is deformed. As a result, the image quality of the printed image will be deteriorated. Therefore, by performing the sector correction with reference to the center of the photosensitive drum 102, the image deterioration can be suppressed.

Note that, for the convenience of description, the main scanning positions of the left side and the right side of the test chart image is symmetrically arranged from the center of the drum. For example, if the sides are not symmetrically arranged, the information of the main scanning position of the respective right and left sides may be input from the host computer 1 as the sector correction seed value. Further, description has been given, for example, in a case where the sector correction is performed with reference to the center of the photosensitive drum 102. Alternatively, the sector correction can be performed with reference to either one of the two sides. For example, when it is set that the longer side is always used as a reference, only an enlargement processing will be performed on the image data to be printed. This provides an advantage in that the image processing unit is simply designed. Further, when it is set that the shorter side is always used as a reference, as the image processing to the image data to be printed, only a reduction processing will be performed. This also provides an advantage in that the image processing unit is simply designed. Further, after the reduction processing, the smaller image size is always obtained with respect to the original image size. Therefore, this provides an advantage in that, frame buffer capacity can be reduced as compared to performing the enlargement processing.

Further, for the convenience of explanation, description has been given in a case where the main scanning position 0 matches with the center of the photosensitive drum 102. Not limited to the case where the main scanning position 0 matches with the center of the photosensitive drum 102, the processing may be performed to obtain 0 (zero) variation amount of the sub-scanning length at an intermediate point of the main scanning position of the side 204*a* and the main scanning position of the side 204*b*.

As mentioned, according to the present embodiment, it is possible to easily set the correction condition which is the parameter to avoid the occurrence of the defective image by the sector deformation. Further, since the constituting parts to detect the output image can be largely reduced, the manufacturing cost can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077525, filed Apr. 4, 2014, which is hereby incorporated by reference herein in its entirety.

What is claimed is:

1. An image forming apparatus comprising:
   an image processing unit configured to perform image processing on image data based on a correction condition;
   a light emitting unit configured to emit light for exposing a photosensitive member based on the image data on which the image processing is performed;
   a feeding cassette configured to feed a recording medium,
   a transferring unit configured to transfer the image formed on the photosensitive member to the recording medium which is fed from the feeding cassette;
   a fixing unit configured to fix the image on the recording medium;
   a control unit configured to cause the light emitting unit and the transferring unit to form a test image on the recording medium, the test image having a first line drawing and a second line drawing, each of which extends in a first direction, and the first line drawing and the second line drawing are provided at different positions in a second direction which is perpendicular to the first direction, wherein the first direction corresponds to the conveying direction of the recording medium;
   a display configured to display a screen for allowing a user to input length information of the first line drawing and length information of the second line drawing; and
   a correction processing unit configured to set the correction condition based on the length information of the first line drawing and the length information of the second line drawing, which are input by the user through the screen,
   wherein the image processing unit is configured to perform the image processing on the image data using the correction condition according to the position of the image data in the second direction.

2. The image forming apparatus according to claim 1,
   wherein the correction processing unit is further configured to set the correction condition based on variation amounts of the first line drawing and the second line drawing, the variation amounts are calculated based on the length information of the first line drawing and the length information of the second line drawing.

3. The image forming apparatus according to claim 2,
   wherein the correction processing unit is further configured to calculate the variation amount based on image resolution used when forming the image.

4. The image forming apparatus according to claim 1, wherein the image processing unit is further configured to perform image processing on the image data based on the correction condition to correct image distortion.

5. The image forming apparatus according to claim 1, wherein the first line drawing and the second line drawing are formed at different positions, and the first line drawing and the second line drawing are formed as line drawings respectively extending in the first direction from a position which is symmetric with reference to a center position of the photosensitive member in the second direction.

6. The image forming apparatus according to claim 1, further comprising:
a storing unit for respectively storing the first line drawing and the second line drawing in advance as the line drawings respectively having predetermined lengths.

7. The image forming apparatus according to claim 1, wherein the correction processing unit is configured to set, in a case where the image is formed on a recording medium having a different size from the recording medium on which the test chart image is formed, a correction condition corresponding to the recording medium of the different size.

8. An image forming apparatus comprising:
an image processing unit configured to perform image processing on image data based on a correction condition;
a light emitting unit configured to emit light for exposing a photosensitive member based on the image data on which the image processing is performed;
a feeding cassette configured to feed a recording medium;
a transferring unit configured to transfer the image formed on the photosensitive member to the recording medium which is fed from the feeding cassette;
a fixing unit configured to fix the image on the recording medium;
a control unit configured to cause the image forming unit and the transferring unit to form a test image on the recording medium, the test image comprising a first line drawing, a second line drawing, and a third line drawing, wherein:
the first line drawing and the second line drawing extend in a first direction, which is a direction in which a recording medium on which the image is formed is conveyed,
the first line drawing and the second line drawing are formed at different positions in a second direction which is orthogonal to a first direction, and
the third line drawing is a line segment which represents a distance between the first line drawing and the second line drawing;
a display configured to display a screen for allowing a user to input length information of the first line drawing, the second line drawing, and the third line drawing; and
a correction processing unit configured to set the correction condition based on the length information, which is input by the user through the screen, of the first line drawing, the second line drawing, and the third line drawing,
wherein the image processing unit is further configured to perform the image processing on the image data using correction condition according to the position of the second direction with reference to the center of the third line drawing.

9. The image forming apparatus according to claim 8, wherein the correction processing unit is further configured to set the correction condition on the basis that a variation amount of the first direction length at a center position of the third line drawing is zero, and based on the variation amount of the length of the first line drawing and the variation amount of the length of the second line drawing, which are obtained based on the length information of the first line drawing and the second line drawing.

* * * * *